United States Patent
Agrawal et al.

(10) Patent No.: US 10,592,568 B2
(45) Date of Patent: *Mar. 17, 2020

(54) RETURNING SEARCH RESULTS UTILIZING TOPICAL USER CLICK DATA WHEN SEARCH QUERIES ARE DISSIMILAR

(71) Applicant: International Business Machines Corporation, Armonk, NY (US)

(72) Inventors: Priyanka Agrawal, Bangalore (IN); Man Chu, Brooklyn, NY (US); Steven M. Pritko, Apex, NC (US); Justin A. Ziniel, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 578 days.

This patent is subject to a terminal disclaimer.

(21) Appl. No.: 15/336,044

(22) Filed: Oct. 27, 2016

(65) Prior Publication Data

US 2018/0121428 A1    May 3, 2018

(51) Int. Cl.
*G06F 16/9535* (2019.01)

(52) U.S. Cl.
CPC ............................ *G06F 16/9535* (2019.01)

(58) Field of Classification Search
None
See application file for complete search history.

(56) References Cited

U.S. PATENT DOCUMENTS

| 7,634,472 | B2 | 12/2009 | Thrall |
| 8,060,513 | B2 | 11/2011 | Basco et al. |
| 8,620,951 | B1 * | 12/2013 | He .................... G06F 16/24578 707/769 |
| 8,661,029 | B1 * | 2/2014 | Kim .................. G06F 16/24578 707/723 |
| 8,909,624 | B2 * | 12/2014 | Gannu .................. G06Q 30/02 707/723 |
| 8,938,463 | B1 * | 1/2015 | Kim ..................... G06F 16/9535 707/751 |
| 9,043,350 | B2 * | 5/2015 | Tomko ................ G06F 16/9535 707/767 |
| 9,298,852 | B2 | 3/2016 | Taropa et al. |
| 2006/0184566 | A1 | 8/2006 | Lo et al. |
| 2011/0208730 | A1 | 8/2011 | Jiang et al. |
| 2011/0264649 | A1 | 10/2011 | Hsiao et al. |

(Continued)

FOREIGN PATENT DOCUMENTS

CN           104731882           6/2015

OTHER PUBLICATIONS

Manavoglu, E. (2011) Method and System for Reducing Sparsity in Click Estimation with Query Segments. IPCOM000211490D.

(Continued)

*Primary Examiner* — Christopher J Raab
(74) *Attorney, Agent, or Firm* — ZIP Group PLLC

(57) ABSTRACT

For a particular search query that is received by a host system, a preliminary set of search results is generated. The host system maps the query to one or more topics that are representative to the query. The host system provides topical click data associated with the topic to a machine-learning module that determines a relevancy score of the result utilizing the topical click data. The host system re-ranks the order of the result within a set of results based upon the relevancy score.

9 Claims, 10 Drawing Sheets

(56) References Cited

U.S. PATENT DOCUMENTS

| | | | |
|---|---|---|---|
| 2011/0270849 A1* | 11/2011 | Varma | G06F 16/3349 |
| | | | 707/749 |
| 2012/0290950 A1 | 11/2012 | Rapaport et al. | |
| 2013/0246412 A1* | 9/2013 | Shokouhi | G06F 16/9535 |
| | | | 707/730 |
| 2014/0351247 A1 | 11/2014 | Li et al. | |
| 2015/0206070 A1 | 7/2015 | Kulkarni et al. | |
| 2015/0278200 A1 | 10/2015 | He et al. | |
| 2015/0293976 A1 | 10/2015 | Guo et al. | |
| 2016/0042296 A1 | 2/2016 | Shan et al. | |
| 2016/0217349 A1 | 7/2016 | Hua et al. | |

OTHER PUBLICATIONS

Strope, B. (2013). Emotional Salience and Clustering for Reranking Search Results. IPCOM000230647D.

Huang, P. S., He, X., Gao, J. et al. (2013). Learning deep structured semantic models for web search using clickthrough data. In Proceedings of the 22nd ACM international conference.

Joachims, T. "Optimizing search engines using clickthrough data." Proc. SIGKDD. ACM, 2002.

Xue, G., et al. "Optimizing web search using web click-through data" Proc. CIKM. ACM, 2004.

Agichtein, E., Brill, E., and Dumais, S. "Improving web search ranking by incorporating user behavior information." Proc. SIGIR. ACM, 2006.

Radlinski, F., Kleinberg, R., and Joachims, T. "Learning diverse rankings with multi-armed bandits." Proc. ICML. ACM, 2008.

http://www.internetlivestats.com/google-search-statistics/. Accessed Oct. 2016.

Aktolga, E., and Allan, J. "Reranking search results for sparse queries." Proc. CIKM. ACM, 2011.

Blei, D.M., and Lafferty, J. "Topic models." Text mining: classification, clustering, and applications. CRC Press, 2009.

Blei, D.M., Ng, A.Y., and Jordan, M.I.. "Latent Dirichlet allocation." JMLR. ACM, 2003.

Carman, M. J., et al. "Towards query log based personalization using topic models." Proc. CIKM. ACM, 2010.

Blei, D.M., et al. "Hierarchical topic models and the nested Chinese restaurant process." NIPS. MIT Press, 2004.

Mell, P., et al. "The NIST Definition of Cloud Computing," Recommendations of the National Institute of Standards and Technology, NIST Special Publication 800-145, Sep. 2011.

List of IBM Patents or Patent Applications Treated as Related, Oct. 2016.

Non Final Office Action, U.S. Appl. No. 15/336,107, dated May 31, 2019.

* cited by examiner

RETURNING SEARCH RESULTS UTILIZING TOPICAL USER CLICK DATA WHEN SEARCH QUERIES ARE DISSIMILAR

FIELD OF THE INVENTION

Embodiments of the invention generally relate to returning improved search query results by utilizing search query topic click through data.

DESCRIPTION OF THE RELATED ART

A number of strategies have been proposed for improving search engine results by exploiting historical patterns of user click data ("click re-ranking"). These strategies are generally geared toward web-scale (i.e., billions of queries each day) search applications, in which users are issuing short, keyword-based queries. In such a regime, it is possible to observe and aggregate the behaviors (e.g., clicking, gesturing, or the like) of many users issuing identical or nearly identical queries. This aggregated behavior data can then be exploited by traditional machine learning techniques to improve the ranking of subsequent occurrences of the same queries. While successful in the aforementioned setting, such approaches are not suitable for applications in which a much smaller set of users is issuing longer form queries, such as an enterprise self-service help desk. In this latter context, occurrences of duplicate or near-duplicate queries are rare. This scarcity severely impedes the ability of a click re-ranking system to average out the noisy interactions of individual users, and to retrieve relevant historical data as new queries arrive.

Relatively little work has been published on exploiting click or gesture data, herein referred to collectively as click data, in the challenging, but important, setting in which queries are dissimilar. An exception is Aktolga, E., and Allan, J. "Reranking search results for sparse queries." Proc. CIKM. ACM, 2011, in which the authors utilize a probabilistic model of answer relevancy that leveraged the click-through data of similar queries to estimate the relevance of an answer for a "sparse query" (i.e., a query without pre-existing click-through data). Similar queries were identified as queries that shared the same set of results, queries that utilized the same subset of an original query as an n-gram sequence, and queries that contained synonymous terms ("query expansion"). A downside of this approach is that it requires retention of a complete history of raw click data associated with each query—an expensive and inefficient proposition if one is interested in preserving only aggregated click data. Additionally, in certain use-cases, these strategies employed for identifying similar queries may cast too broad a net; for instance, popular products supported by a help desk would appear in many n-gram sequences, leading to a risk of accumulating click data from queries about issues entirely unrelated to the sparse query.

SUMMARY

In an embodiment of the present invention, a method of re-ranking search results by utilizing topical click data in an environment where search result queries are ostensibly dissimilar is described. The method includes determining, with a host device processor, a preliminary result [R] of a search query [Q] received by the host device, determining, with the host device processor, a topic [T] that is representative of the search query [Q], retrieving, with the host device processor, topical click data [C] associated with the topic [T] and associated with the result [R], determining, with the host device processor, a relevance value [V] of the result [R] utilizing the topical click data [C], and re-ranking, with the host device processor, the order of the preliminary result [R] within a set of results based upon the relevance value [V].

In another embodiment of the present invention, a computer program product for re-ranking search results by utilizing topical click data in an environment where search result queries are ostensibly dissimilar is presented. The computer program product includes a computer readable storage medium having program instructions embodied therewith. The program instructions are readable by the computer to cause the computer to determine a preliminary result [R] of a search query [Q] received by the host device, determine a topic [T] that is representative of the search query [Q], retrieve topical click data [C] associated with the topic [T] and associated with the result [R], determine a relevance value [V] of the result [R] utilizing the topical click data [C], and re-rank the order of the preliminary result [R] within a set of results based upon the relevance value [V].

In yet another embodiment, a computer includes a processor and a memory communicatively coupled to the processor. The memory is encoded with instructions that when executed by the processor cause the processor to determine a preliminary result [R] of a search query [Q] received by the host device, determine a topic [T] that is representative of the search query [Q], retrieve topical click data [C] associated with the topic [T] and associated with the result [R], determine a relevance value [V] of the result [R] utilizing the topical click data [C], and re-rank the order of the preliminary result [R] within a set of results based upon the relevance value [V].

These and other embodiments, features, aspects, and advantages will become better understood with reference to the following description, appended claims, and accompanying drawings.

It is to be noted, however, that the appended drawings illustrate only example embodiments of the invention, and are therefore not considered a limitation of the scope of embodiments of the invention.

DETAILED DESCRIPTION

Embodiments relate to data handling system including numerous user devices and one or more host devices, collectively referred to as the host system. Each particular user device is communicatively connected with at least one host device of the host system. For a particular search query that is received by the host system, a preliminary set of search results is therein generated. One <query, result> data pair of the preliminary set of search results is utilized as an input by a topic module of the host system. The topic module maps the query of the <query, result> data pair to one or more query topics, thereby creating at least one <topic, result> data pair mapped to the <query, result> data pair. A topical click-data module within the host system provides topical click data associated with the <topic, result> data pair. A machine-learning module of the host system determines a relevancy score of the <query, result> data pair utilizing the topical click data associated with the <topic, result> data pair. The host system may determine the relevancy score(s) for multiple <query, result> data pairs of the preliminary set of search results. The host system provides a re-ranked search result for the search query relative to the ranking of the preliminary search results by utilizing the relevancy score(s) of the <query, result> data pair(s).

Figure 1:
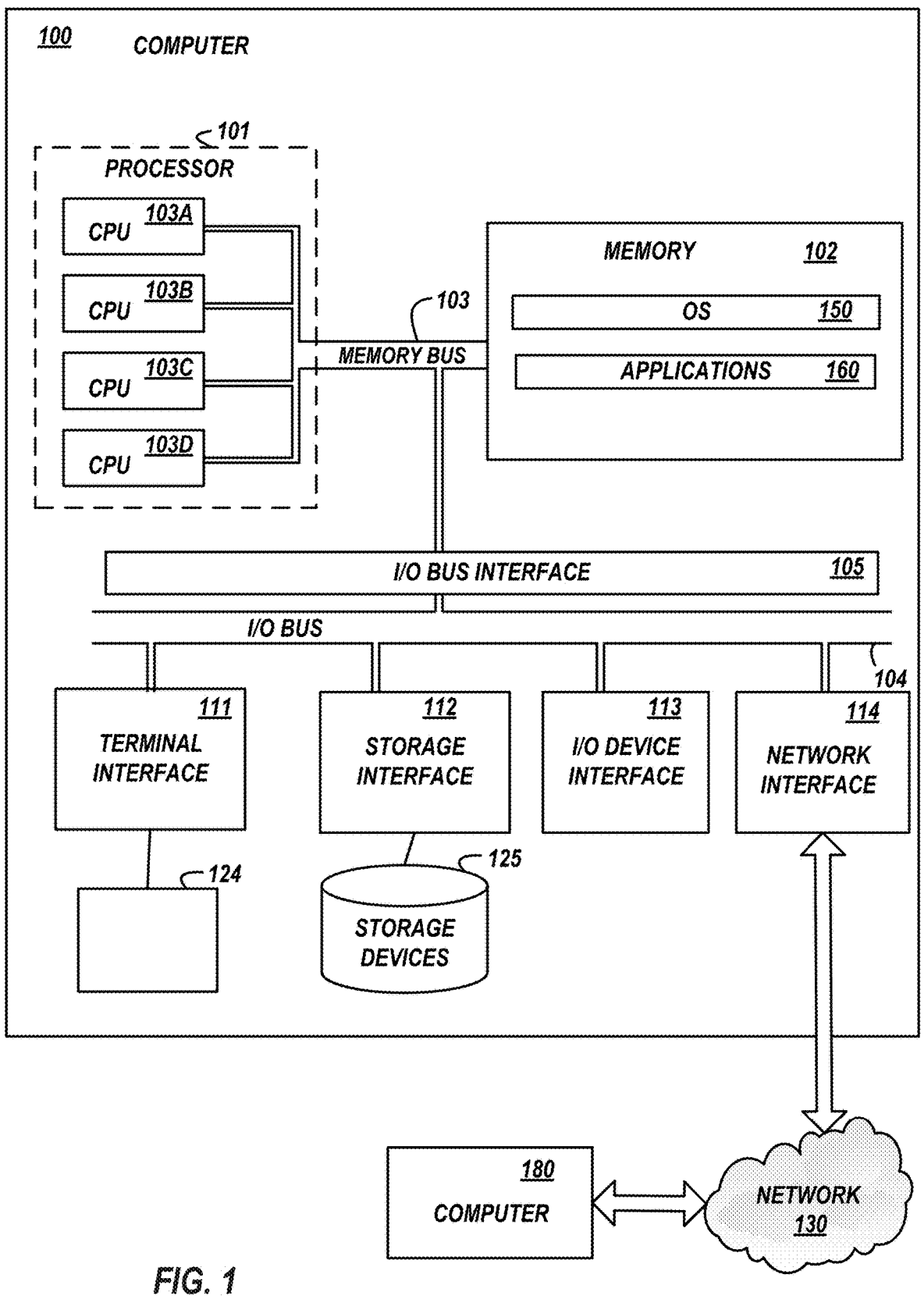
FIG. 1 illustrates a high-level block diagram of an exemplary computer for implementing various embodiments of the invention.

Referring to the Drawings, wherein like numbers denote like parts throughout the several views, FIG. 1 depicts a high-level block diagram representation of a computer 100 connected to another computer 180 via a network 130, according to an embodiment of the present invention. Computer 180 may include the same components, fewer components, or additional components as computer 100. The term "computer" is used herein for convenience only, and in various embodiments is a more general data handling system, such as a mobile phone, tablet, server computer, wearable device, etc. The mechanisms and apparatus of embodiments of the present invention apply equally to any appropriate device. In a particular embodiment, computer 100 is a client computer such as a mobile phone and computer 180 is a host computer such as a server, and may be referred to collectively herein as a data handling system. In particular embodiments, there may be multiple computers 100 and multiple computers 180. In these embodiments, each computer 100 is connected to at least one of the computers 180 via network 130 and the computers 180 may also be connected to one or more of the other computers 180 by network 130. The computer 180 or multiple computers 180 may be referred to herein as host system.

The major components of the computer 100 may comprise one or more processor 101, system memory 102, terminal interface 111, storage interface 112, I/O (Input/Output) device interface 113, and/or network interface 114, all of which are communicatively coupled, directly or indirectly, via one or more busses, such as memory bus 103, I/O bus 104, an I/O bus interface unit 105, etc.

The computer 100 contains one or more general-purpose programmable central processing units (CPUs) 103A, 103B, 103C, and 103D, herein generically referred to as processor 101. In embodiments, the computer 100 contains multiple processors 101 typical of a relatively large system such as a server computer. Each processor 101 executes instructions stored in the system memory 102 and may comprise one or more levels of on-board cache. One of the multiple processors 101 may be a coprocessor. Generally, the coprocessor also executes instructions stored in the system memory 102 and may comprise one or more levels of on-board cache. The coprocessor generally allows the processor 101 to offload the execution of some instructions stored in the system memory 102 allowing the processor 101 to execute other instructions stored in the system memory 102. The coprocessor may also operate upon data that was previously operated upon by the processor 101 or upon data that will be subsequently operated upon by the processor 101. The offloading to the coprocessor generally allows for improved performed of particular instructions stored in the system memory 102.

In an embodiment, the system memory 102 may comprise a random-access semiconductor memory, storage device, or storage medium for storing or encoding data and programs. In another embodiment, the system memory 102 represents the entire virtual memory of the computer 100, and may also include the virtual memory of other computers coupled to the computer 100 or connected via the network 130. The system memory 102 is conceptually a single monolithic entity, but in other embodiments the system memory 102 is a more complex arrangement, such as a hierarchy of caches and other memory devices. For example, memory 102 may exist in multiple levels of caches, and these caches may be further divided by function, so that one cache holds instructions while another holds non-instruction data, which are read or otherwise operated upon by the processor 101. Memory 102 may be further distributed and associated with different processors 101 or sets of processors 101, as is known in any of various so-called non-uniform memory access (NUMA) computer architectures.

The system memory 102 stores or encodes an operating system 150 and one or more applications 160. Although the operating system 150 and applications 160 are illustrated as being contained within the memory 102 in the computer 100, in other embodiments some or all of them may be on a different computer and may be accessed remotely, e.g., via network 130. The computer 100 may use virtual addressing mechanisms that allow the programs of the computer 100 to behave as if they only have access to a large, single storage entity instead of access to multiple, smaller storage entities. Thus, while operating system 150 and applications 160 are illustrated as being contained within the system memory 102, these elements are not necessarily all completely contained in the same storage device at the same time. Further, although operating system 150 and applications 160 are illustrated as being separate entities, in other embodiments some of them, portions of some of them, or all of them may be packaged together, etc.

In an embodiment, operating system 150 and applications 160 each comprise instructions or statements that execute on the one or more processors 101 and/or instructions or statements that are called by the instructions or statements that execute on the one or more processors 101 to carry out the functionality described below. When such program instructions are able to be run by the one or more processors 101, such computer becomes a particular machine configured to carry out such instructions.

One or more processors 101 or a component of the processor 101 may function as a general-purpose programmable graphics processor unit (GPU) that builds images (e.g. a GUI) for output to a display 124. The GPU, working in conjunction with one or more applications 160, determines how to manipulate pixels of display 124, such as touch screen, to create a display image or user interface. Ultimately, the image (e.g. GUI, etc.) is displayed to a user via display 124. The processor 101 and GPU may be discrete components interconnected by one or more busses or may be integrated into a single component.

The memory bus 103 provides a data communication path for transferring data among the processor 101, the system memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices integral within the computer 100. For example, the terminal interface unit 111 supports the attachment of one or more I/O devices, which may comprise user input output devices (such as a display 124, speaker, touchscreen, camera, touchpad, buttons, etc.). The user may manipulate the I/O devices using a user interface, in order to provide input data and commands to the user I/O devices or to computer 100, and may further receive output data. For example, the interface may be presented via the display 124, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate application 160 data, function, etc.

The storage interface unit 112 supports the attachment of one or more disk drives or storage devices 125. In an embodiment, the storage devices 125 are disk drive storage device(s), flash storage device(s), or the like, and in embodiments, the multiple devices are configured to appear as a single large storage device. The contents of the system memory 102, or any portion thereof, may be stored to and retrieved from the storage devices 125, as needed. The storage devices 125 generally have a slower access time than does the memory 102, meaning that the time needed to read and/or write data from/to the memory 102 is less than the time needed to read and/or write data from/to for the storage devices 125.

The I/O device interface 113 provides an interface to any of various other external input/output devices that are external to computer 100, such as a wearable device, a printer, etc. The network interface 114 provides one or more communications paths from the computer 100 to other data handling devices such as numerous other computers (e.g., computer 180); such paths may be comprised within, e.g., one or more networks 130.

Although the memory bus 103 is shown in FIG. 1 as a relatively simple, single bus structure providing a direct communication path among the processors 101, the system memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol. Therefore, network interface 114 may connect a wide variety of devices or other computers to computer 100 and to each other, such as, but not limited to, servers, computers, bus adapters, PCI adapters, PCIe adapters, NVLink adapters, or computer 180 using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

Though shown as distinct entities, the multiple I/O interface units 111, 112, 113, and 114 or the functionality of the I/O interface units 111, 112, 113, and 114 may be integrated into the same device, adapter, etc.

In various embodiments, the computer 180 is a multi-user mainframe computer, a single-user system, a server computer, storage system, or similar device that has little or no direct user interface, but receives requests from other computers, such as computer 100. In such embodiments, the computer 100 may be implemented as a desktop computer, portable computer, laptop or notebook computer, tablet computer, pocket computer, telephone, smart phone, automobile infotainment console, teleconferencing system, appliance, or any other appropriate type of electronic device. In other embodiments, the computer 100 and computer 180 may be the same type of computer.

The network 130 may be any suitable network or combination of networks and may support any appropriate protocol suitable for communication of data and/or code to/from the computer 100 and at least the computer 180. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. The individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implemented e.g. upon computer 100 according to various embodiments of the invention may be implemented in a number of manners, including using various computer applications, routines, components, programs, objects, modules, data structures, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

Figure 2:
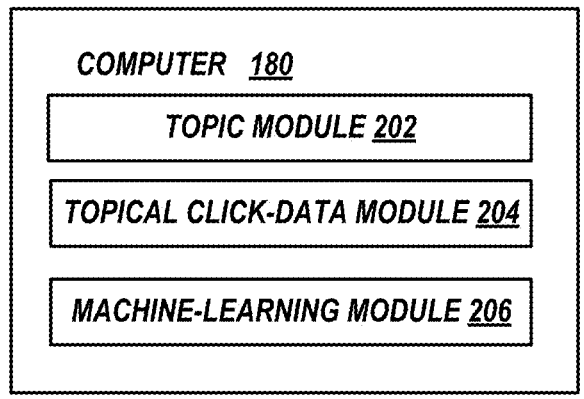
FIG. 2 illustrates a high-level block diagram of an exemplary computer for implementing various embodiments of the invention.

FIG. 2 depicts a high-level block diagram representation of computer 180, according to an embodiment of the present invention. Computer 180 includes a topic module 202, topical click-data module 204, and machine-learning module 206. In an embodiment, modules 202, 204, and/or 206 may be one or more applications 106 stored in memory 102 of computer 180. In another embodiment, modules 202, 204, and/or 206 may be one or more hardware processing devices such as an application specific integrated circuit (ASIC), field programmable gate array (FPGA), or the like. The hardware processing device(s) may be connected to processor 101 and memory 102 of computer 180 by one or more busses and may function as a co-processor of computer 180. In an embodiment, topic module 202, topical click-data module 204, and machine-learning module 206 and/or the components of topic module 202, topical click-data module 204, and machine-learning module 206 may be located in the same computer 180. In other embodiments, topic module 202, topical click-data module 204, or machine-learning module 206 and/or one or more components of topic module 202, topical click-data module 204, or machine-learning module 206 may be located in a different computer 180 relative to other modules 202, 204, 206 or relative to other components of modules 202, 204, or 206.

Figure 3:
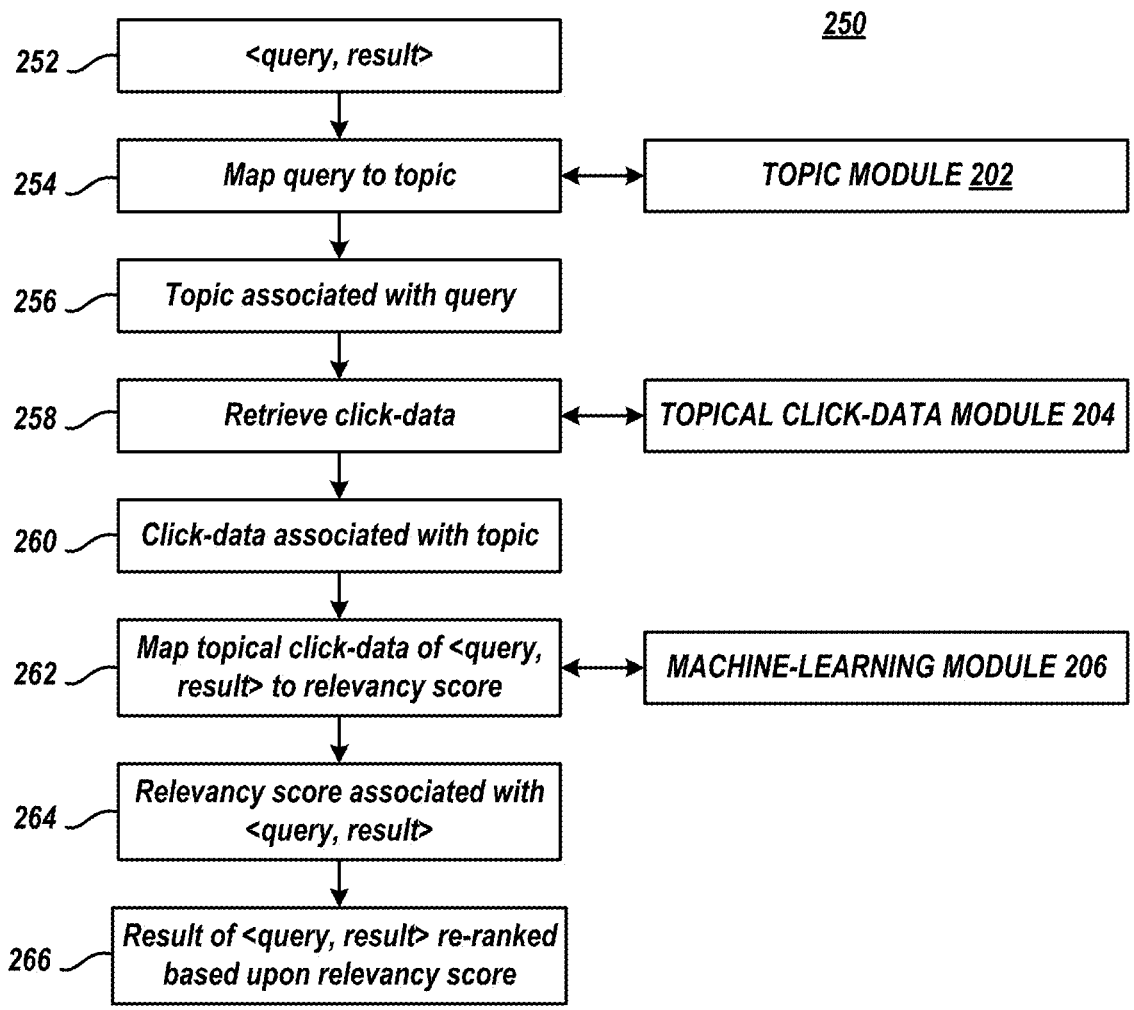
FIG. 3 depicts a high-level block diagram of a method of returning search results utilizing topical user click data, according to an embodiment of the present invention.

FIG. 3 depicts a high-level block diagram of a method 250 of returning search results utilizing topical user click data, according to an embodiment of the present invention. In various embodiments, the computer 180 receives a search query from computer 100 via network 130 and computer 180 compiles a preliminary search result comprising a plurality of results. The results are generally separate or distinct electronic data sets (e.g., webpages, or the like). Subsequently, computer 180 forms one or more <query, result> data pairs associated with the received query and a particular result of the preliminary search result (block 252). In another implementation, the preliminary search result and/or the <query, result> data pairs are generated by another computer or computers and one or more <query, result> data pairs are therefrom received by computer 180 via network 130 (block 252).

At least one <query, result> data pair is utilized as an input by topic module 202 of computer 180. The topic module 202 maps the query of the <query, result> data pair to one or more query topics and creates at least one <topic, result> data pair that is mapped to the <query, result> data pair (block 254), thereby associating the topic with the query (block 256).

At least the topic of the <topic, result> data pair is utilized as an input by the topical click-data module 204 to retrieve topical click data (block 258) that is relevant or otherwise associated with the topic of the <topic, result> data pair (block 260).

The machine-learning module 206 utilizes the topical click data associated with the topic as an input to map the topical click data associated with the <query, result> data pair to a relevancy score (block 262), thereby associating the relevancy score with the <query, result> data pair (block 264).

The relevancy score is utilized by computer 180 to re-rank the result of the <query, result> data pair within the plurality of results (block 266). For example, the result is moved up in the order of the plurality of results, relative to the order of the preliminary search result, if the relevancy score is high or is moved down in the order of the plurality of results, relative to the order of the preliminary search result, if the relevancy score is low. When a relevancy score is determined for each result of the plurality of results, the plurality of results may be re-ranked by relevancy scores. For example, the plurality of results are re-ranked from highest relevancy score to lowest relevancy score.

The computer 180 may provide the search result comprising at least one re-ranked result within the plurality of results to computer 100 which, in turn, may be provided to the user of computer 100 via one or more interfaces.

Figure 4:
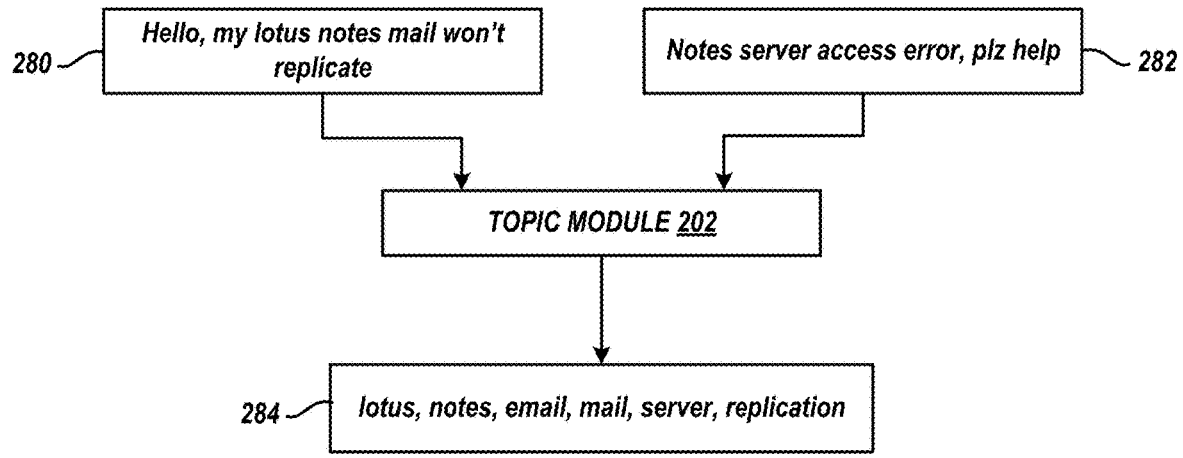
FIG. 4 and FIG. 5 depicts exemplary high-level block diagrams of a topic module that maps one or more topics to one or more ostensibly dissimilar queries, according to one or more embodiments of the present invention.
Figure 5:
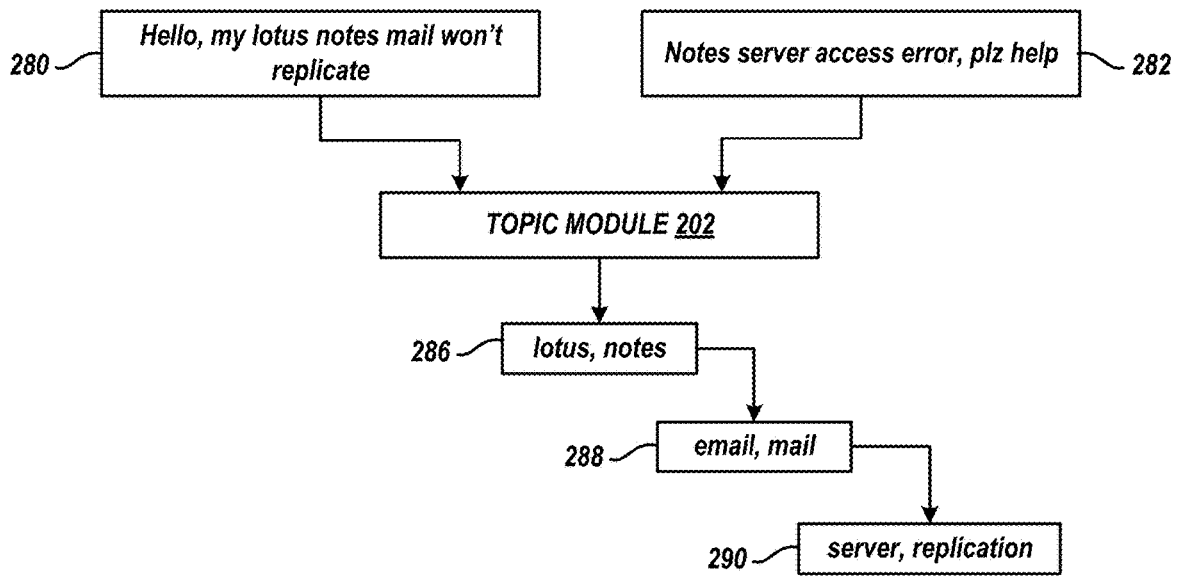

FIG. 4 and FIG. 5 depicts exemplary high-level block diagrams of topic module 202 mapping one or more topics to a query of a <query, result> data pair or the <query, result> data pair, according to an embodiment of the present invention. The topic module 202 maps the query or data pair to at least one topic which is one or more keywords that are generally representative of the associated query. The topic module 202 may utilize text mining techniques to read the query, analyze the query, and output a topic or distribution of topics of the query. For example, topic module 202 may utilize a particular text mining technique known in the art as "Topic Modeling," exemplarity described in Blei, D. M., and Lafferty, J., "Topic Models." Text Mining: classification, clustering, and applications, CRC Press, 2009." To identify topics that underlie the superficially dissimilar queries, the topic module 202 may utilize Latent Dirichlet Allocation (LDA) to build the topic model from query logs as is exemplarity described in Blei, D. M., and Ng, A. Y., and Jordan, M. I., "Latent Dirichlet Allocation," JMLR., ACM., 2003."

As depicted in FIG. 4 and FIG. 5, two desperate queries may be ingested by topic module 202 and one or more topics may be assigned to the two desperate queries. In other words, topic module 204 can map the same topic(s) to ostensibly dissimilar queries. By distilling such distinct queries into a smaller collection of topics—a form of dimensional reduction—the likelihood of obtaining click data associated with the topic(s) is increased (relative to the probability of click data existing with the query itself) which results in a greater probability of leveraging the topical click data to re-rank the order of the plurality of search results in order to provide a more accurate plurality of search results to the query. The term ostensibly dissimilar queries or the like utilized herein means that queries that include a plurality of words organized in a character string that share less than a quarter percent of characters in the character sting.

FIG. 4 depicts query 280 of, "Hello, my lotus notes mail won't replicate" and a query 282 of, "Notes server access error, plz help" is received by topic module 202. Topic module 202 maps such ostensibly distinct queries to one or more shared topics 284 of "lotus," "notes," "email," "mail," "server," and/or "replication." In a particular embodiment, the output of topic module 202 is a single topic which is most representative of an associated inputted query.

FIG. 5 depicts the output of topic module 202 when a hierarchical topic model is utilized by topic module 202 to output hierarchical topics. An exemplary hierarchical topic model is described in Blei, D. M., et al., "Hierarchical Topic models and the Nested Chinese Restaurant Process," NIPS., MIT Press., 2004." By utilizing the hierarchical topic model, topic module 202 may weigh the importance of topics differently depending upon their depth in the topic hierarchy, such that topics that are closer to the root of the hierarchy are more important than topics which are more distal to the hierarchy root.

FIG. 5 depicts dissimilar queries 280, 282 being ingested by module 202 and sharing a common topic hierarchy output. The exemplary topic hierarchy output depicts includes one or more topics 286 being located closest to the root of the hierarchy and, thus, weighed as most important, one or more topics 288 being located further away from the root of the hierarchy and, thus, weighed as relatively less important, and one or more topics 290 being located furthest away from the root of the hierarchy and, thus, weighed as the least important. In other words, module 202 would highly weight the "lotus" and/or "notes" topic(s) 286 to queries 280, 282, give moderate weight to the "email," and/or "mail." Topic(s) 288 to queries 280, 282, and lesser weight to the "server," and/or "replication," topic 290 of queries 280, 282. Such a strategy can improve the quality of topical click data retrieved from the topical click data module 204 by more appropriately weighting the importance of various topics.

In an embodiment, the topic module 202 may output a single topic that is most representative of the inputted associated query. If the most representative single topic does not have a degree of relation value above a predetermined threshold (i.e. the single topic isn't an adequate representational topic of the associated query), the topic module 202 may output one or more topics that share a common ancestry of a root of the topic hierarchy.

Figure 6:
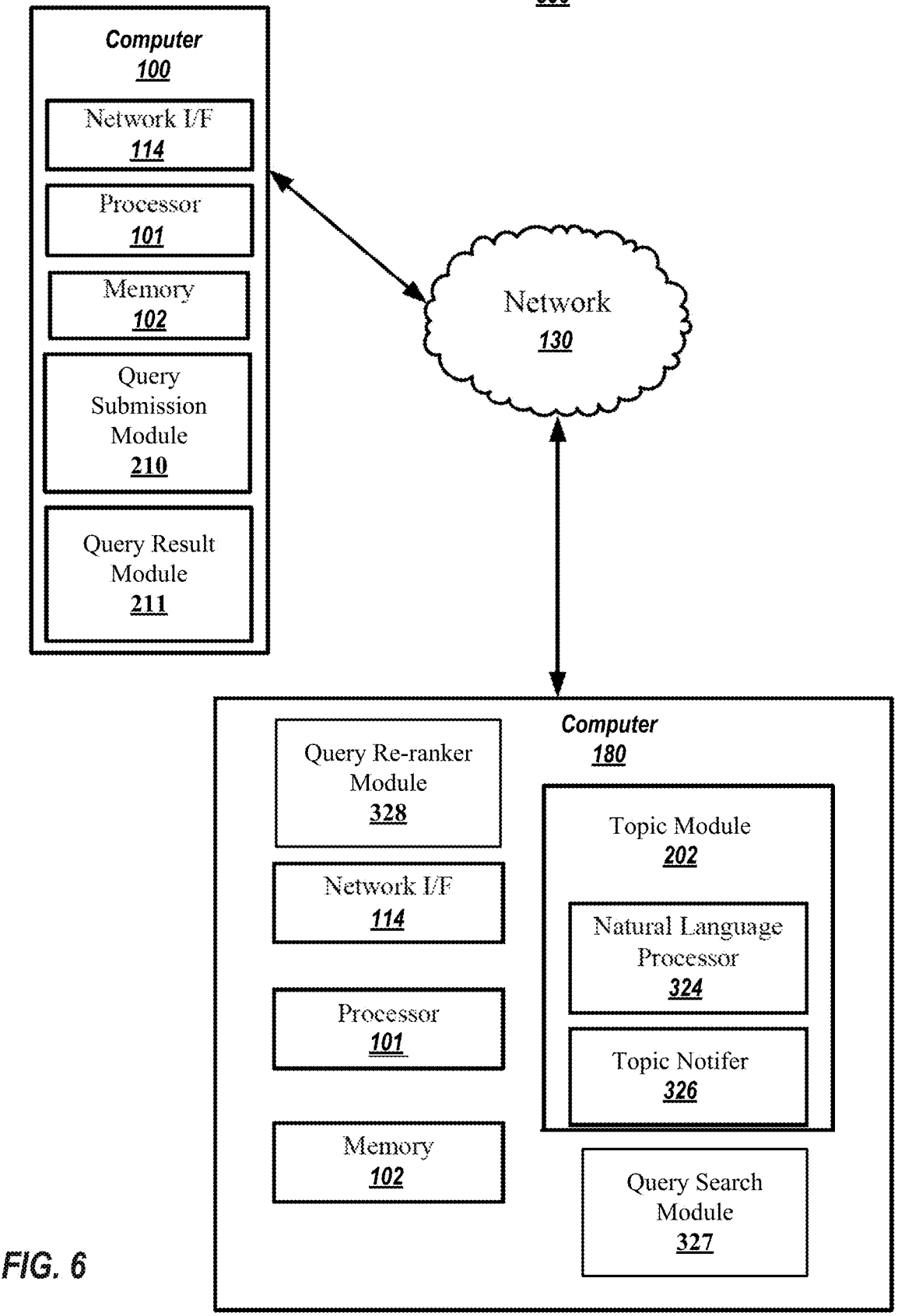
FIG. 6 illustrates a block diagram of an exemplary computing environment in which embodiments of the present disclosure may be implemented.

FIG. 6 illustrates a block diagram of an example computing environment 300 in which illustrative embodiments of the present disclosure may be implemented. In some embodiments, the computing environment 300 includes computer 100 which is configured as a remote device, which may be referred to herein as remote device, and a computer 180 which is configured as a host device, which may be referred to herein as host device. Computer 180 may have the same, fewer, or greater computing components relative to computer 100, shown in FIG. 1.

The remote device and the host device may include any commercially available or custom software (e.g., browser software, communications software, server software, natural language processing software, search engine and/or web crawling software, filter modules for filtering content based upon predefined parameters, etc.). The remote device and the host device may be distant from each other and communicate over network 130. In some embodiments, the host device may be a central hub from which remote device can establish a communication connection, such as in a client-server networking model. Alternatively, the host device and remote device may be configured in any other suitable networking relationship (e.g., in a peer-to-peer configuration or using any other network topology).

In certain embodiments, the remote device and the host device may be local to each other and communicate via any appropriate local communication medium. For example, the remote device and the host device may communicate using a local area network (LAN), one or more hardwire connections, a wireless link or router, or an intranet. In some embodiments, the remote device and the host device may be communicatively coupled using a combination of one or more networks and/or one or more local connections. For example, the remote device may be hardwired to the host device (e.g., connected with an Ethernet cable) while a second remote device (not shown) may communicate with the host device using the network 130 (e.g., over the Internet).

In some embodiments, the network 130 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 130.

In some embodiments, the remote device may enable users to submit (or may submit automatically with or without user input) a search query, to the host device(s) in order to have the host device provide back to the remote device an electronic document (e.g. a webpage, etc.) including a re-ranked search result comprising a plurality of results. For example, the remote device may include a query submission module 210 and query result module 211 and a user interface (UI).

The query submission module 210 may be in the form of a web browser or any other suitable application 160, the query result module 211 may be in the form of a web browser or any other suitable application 160, and the UI may be any type of interface (e.g., command line prompts, menu screens, graphical user interfaces). The UI may allow a user to interact with the remote device so that the query submission module 210 submits the search query to the host device. Likewise, the UI may allow a user to interact with the electronic document that contains the search result comprising a plurality of re-ranked results that is received from the host device by the query result module 211.

In some embodiments, the topic module 202 may include a natural language processor 324 and a topic notifier 326. The computer 180 may further include a query result re-ranker module 328. The natural language processor 324 may include numerous subcomponents, such as a tokenizer, a part-of-speech (POS) tagger, a semantic relationship identifier, a syntactic relationship identifier, and a topic relationship analyzer. An example natural language processor is discussed in more detail in reference to FIG. 7.

In some embodiments, the query re-ranker module 328 may be configured to rank the order of the plurality of results of the search query by relevance score. In embodiments, each result of the preliminary search result is assigned a relevance score by machine learning module 206. The query re-ranker module 328 may re-rank or otherwise order the plurality of results of the search query by the relevance score and submit the electronic document containing the re-ranked plurality of results to the query result module 211 of the remote device. As such, the query re-ranker module 328 may be connected to the machine learning module 206 for the query re-ranker module 328 to receive relevance scores that are associated with one or more of the plurality of results of the search query. The query re-ranker module 328 may also form the preliminary search result comprising the preliminary plurality of results of the search query.

In some embodiments, search module 327 may further include a search application. The search module 327 may be implemented using a conventional or other search engine, and may be distributed across multiple distinct host computer systems. The search module 327 may be configured to search one or more databases, data spaces, or other computer systems connected to host device for electronic documents (e.g. webpages, etc.) relevant to the search query. The links to the relevant electronic documents may be packaged by the search module 327 into a preliminary electronic document which contains preliminarily ordered or ranked links to the relevant electronic documents. For example, the search module 327 may be configured to search a corpus of information related to the search query in order to create the preliminary search result comprising the initially ordered plurality of results of the search query that may be subsequently re-ranked utilizing topical click data as is disclosed herein.

In some embodiments, the topic notifier 326 may be configured to send the assigned or mapped topic associated with the query to topical click-data module 206.

While FIG. 6 illustrates a computing environment 300 with a single host device and a single remote device, suitable computing environments for implementing embodiments of this disclosure may include any number of remote devices and/or numerous host devices which may be referred herein as a data-handling system. The various modules, systems, and components illustrated in FIG. 5 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest and topically annotate search queries, and the second host device may include a software module configured to obtain topical click data associated with the assigned search query topic.

It is noted that FIG. 6 is intended to depict the representative major components of an exemplary computing environment 300. In some embodiments, however, individual components may have greater or lesser complexity than as represented in FIG. 5, components other than or in addition to those shown in FIG. 5 may be present, and the number, type, and configuration of such components may vary.

Figure 7:
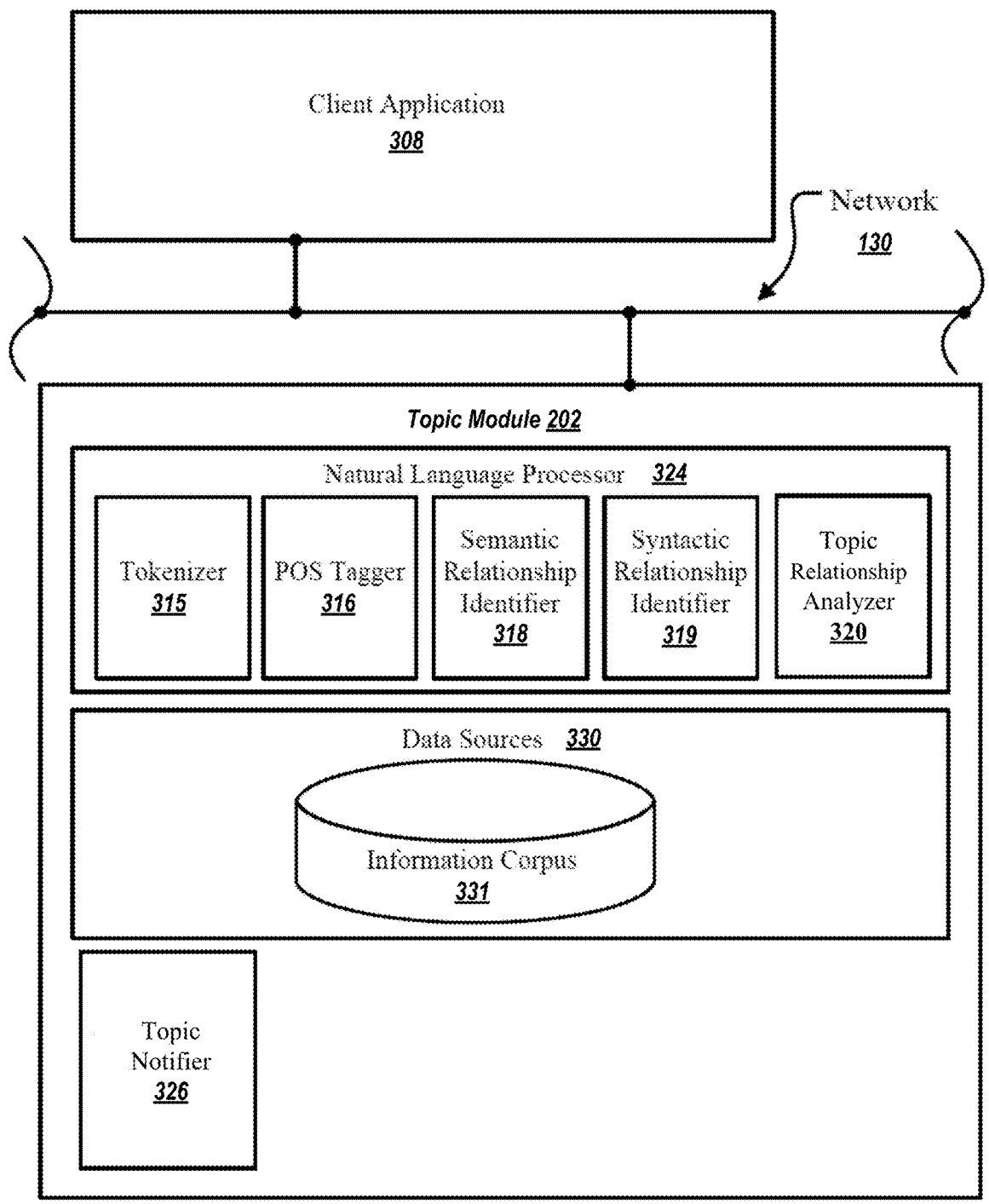
FIG. 7 depicts a block diagram of an exemplary system architecture that includes a natural language processor that is configured to determine and assign one or more topics to a received query, according to one or more embodiments of the present invention.

Referring now to FIG. 7 that which depicts a block diagram of an exemplary system architecture 301, including a natural language processor 324 that is configured to determine and assign one or more topics of a received query.

In some embodiments, a remote device (such as computer 100 of FIG. 1) may submit a search to the natural language processor 324 which may apart of topic module 202. Such a remote device may include a client application 308 which may itself involve one or more applications 160 stored upon memory 102 and evoked by processor 101 of the remote device to generate and dispatch the search query to natural language processor 324 via a network 130.

Consistent with various embodiments, the natural language processor 324 may respond to search query submissions sent by the client application 308 or by query submission module 210. Specifically, the natural language processor 324 may analyze the received query to map or otherwise assign one or more topics or topical keywords to the query.

In some embodiments, the natural language processor 324 may include a tokenizer 315, part-of-speech (POS) tagger 316, semantic relationship identifier 318, syntactic relationship identifier 319, and topic relationship analyzer 320.

The natural language processor 324 may be an application 160 that analyzes a human readable text or character string, herein referred to as a text string, of the received query. The natural language processor 324 may perform various analytic methods and techniques for analyzing the text sting (e.g., syntactic analysis, semantic analysis, etc.). The natural language processor 324 may be configured to recognize and analyze any number of natural languages. In some embodiments, the natural language processor 324 may parse passages of the documents. Further, the natural language processor 324 may include various modules to perform analyses the text string. These modules may include, but are not limited to, tokenizer 315, POS tagger 316, semantic relationship identifier 318, syntactic relationship identifier 319, and topic relationship analyzer 320.

In some embodiments, tokenizer 315 may be an application 160 that performs lexical analysis upon the text string. The tokenizer 315 may convert a sequence of characters into a sequence of tokens. A token may be a string of characters included in the text string and categorized as a meaningful symbol. Further, in some embodiments, the tokenizer 315 may identify word or numerical boundaries in the text string and break any text or numerical passages within the text string into their component text or numerical elements, such as words, multiword tokens, numbers, punctuation marks, or the like. In some embodiments, the tokenizer 315 may receive the text string, identify the lexemes in the text string, and categorize them into tokens.

Consistent with various embodiments, the POS tagger 316 may be an application 160 that marks up a word in the text string to correspond to a particular part of speech. The POS tagger 316 may read a passage or other text in natural language and assign a part of speech to each word or other token. The POS tagger 316 may determine the part of speech to which a word (or other text element) of the text string corresponds based on the definition of the word and the context of the word. The context of a word may be based on its relationship with adjacent and related words in the text string. In some embodiments, the context of a word may be dependent on one or more previously analyzed text strings of other queries (e.g., the content of one text string of a first query may shed light on the meaning of another text string of a second query). Examples of parts of speech that may be assigned to words include, but are not limited to, nouns, verbs, adjectives, adverbs, and the like. Examples of other part of speech categories that POS tagger 316 may assign include, but are not limited to, comparative or superlative adverbs, wh-adverbs, conjunctions, determiners, negative particles, possessive markers, prepositions, wh-pronouns, and the like. In some embodiments, the POS tagger 316 may tag or otherwise annotate tokens of the text string with part of speech categories. In some embodiments, the POS tagger 316 may tag tokens or words of a passage to be parsed by other components of the natural language processor 324.

In some embodiments, the semantic relationship identifier 318 may be an application 160 that is configured to identify semantic relationships of recognized text elements (e.g., words, phrases) in the text string. In some embodiments, the semantic relationship identifier 318 may determine functional dependencies between entities and other semantic relationships.

Consistent with various embodiments, the syntactic relationship identifier 319 may be an application 160 that is configured to identify syntactic relationships in a text string composed of tokens. The syntactic relationship identifier 319 may determine the grammatical structure of the text string such as, for example, which groups of words are associated as phrases and which word is the subject or object of a verb. The syntactic relationship identifier 319 may conform to formal grammar.

Consistent with various embodiments, the topic relationship analyzer 320 may be an application that is configured to measure the degree of relation between the assigned topic and the text string. For example, the topic module 202 may assign a topic to the query and the topic relationship analyzer 320 may assign a high degree of relation value if the analysis of the text string indicates the relationship between the analyzed text string and the assigned topic is strong and may assign a low degree of relation value if the analysis of the text string indicates the relationship between the analyzed text string and the assigned topic is weak.

In some embodiments, the natural language processor 324 may be configured to identify topical keywords within the text string that are preselected as high quality indicators of main idea or topic of the text string (e.g., indicators of positive sentiment could include brilliant, excellent, fantastic, or the like). Various tools and algorithms may be used the natural language processor 324 as are known to those skilled in the art (e.g., Naïve Bayes lexical model).

In some embodiments, the natural language processor 324 may be an application 160 that may parse the text string and generate corresponding data structures for one or more portions of the text string. For example, in response to receiving the query at the natural language processor, the natural language processor may output parsed text elements from the text string of the query. In some embodiments, a parsed text element may be represented in the form of a parse tree or other graph structure. To generate the parsed text element, the natural language processor 324 may envoke one or more of the tokenizer 315, POS tagger 316, semantic relationship identifier 318, syntactic relationship identifier 319, and/or topic relationship analyzer 320.

In some embodiments, the output of the natural language processor 324 may be stored as an information corpus 331 in one or more data sources 330 provided by memory 102 and/or one or more storage devices 125 within computer 180. In some embodiments, data sources 330 may include data warehouses, information corpora, data models, and document repositories. The information corpus 331 may enable data storage and retrieval. In some embodiments, the information corpus 331 may be a storage mechanism that houses a standardized, consistent, clean, and integrated copy of the ingested and parsed query. Data stored in the information corpus 331 may be structured in a way to specifically address analytic requirements. For example, the information corpus 331 may store the ingested query text string in order to make assigning a topic to the query easier. In some embodiments, the information corpus 331 may be a relational database.

Figure 8:
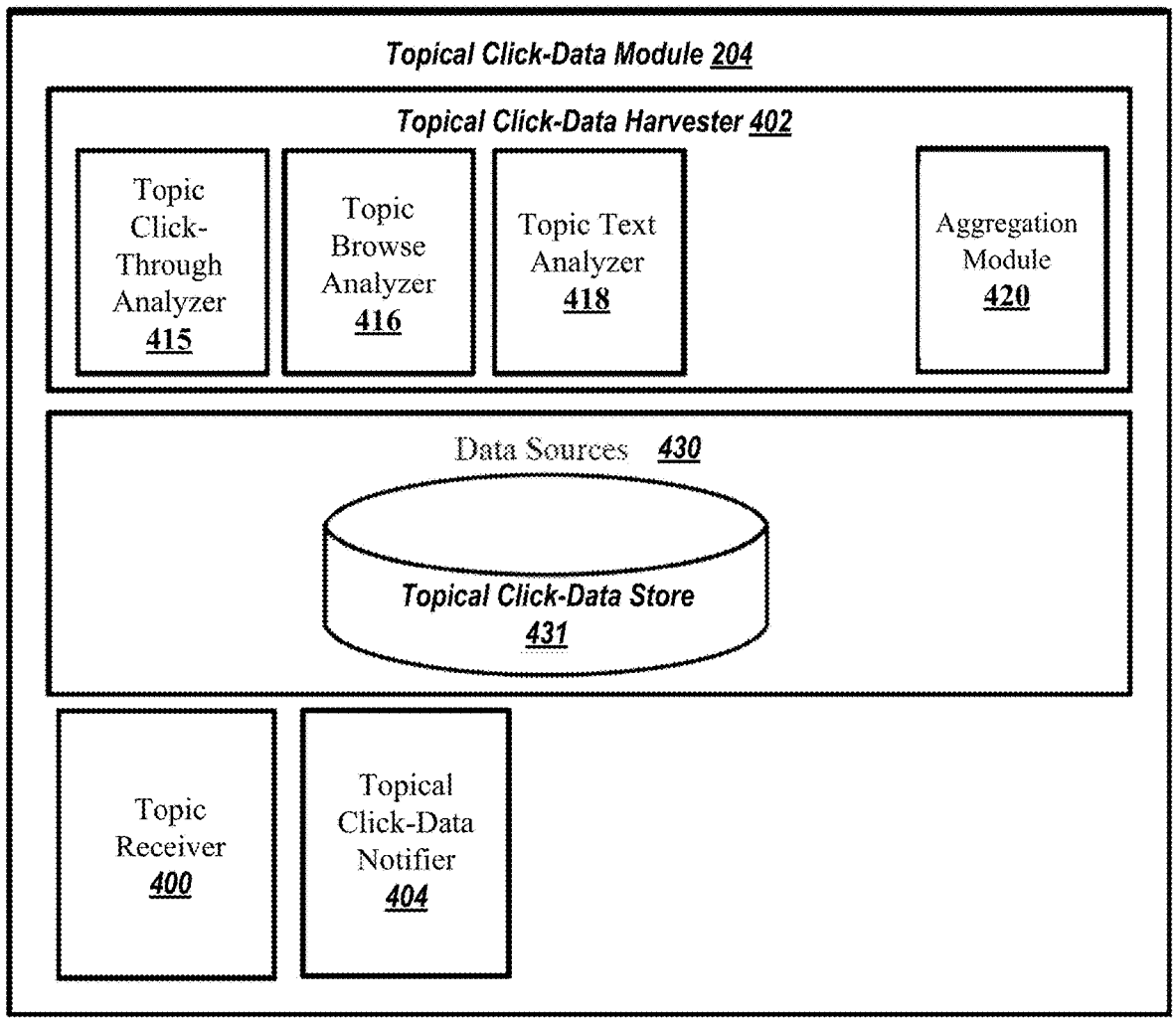
FIG. 8 depicts a block diagram of an exemplary topical click-data module, according to one or more embodiments of the present invention.

Referring now to FIG. 8 that which depicts a block diagram of an exemplary topical click-data module 204 which includes a topical click-data harvester 402 that is configured to harvest and aggregate topical click data, a topic receiver 400 that is configured to receive a topic, and a topical click-data notifier 402 that is configured to provide aggregated topical click data for the received topic. In some embodiments, topic receiver 400 may receive a <topic, result> data pair from topic module 202.

Consistent with various embodiments, the topical click-data module 204 may respond to topic submissions sent by topic module 202. Specifically, prior to the topical click-data module 204 responding a particular topic submission, the topical click-data module 204 may gather or harvest topical click data and aggregate the harvested topical click data. Upon topic receiver 400 receiving the <topic, result> data pair from topic module 202, the associated topical click-data is retrieved. The <topic, result> data pair and the retrieved applicable topical click-data is sent by topical click data notifier 402 to machine learning module 206. The machine learning module 206 processes the aggregated topical click data to determine the relevance of the result associated with the topic and assigns the relevant score to the <topic, result> data pair.

In some embodiments, the topical click-data harvester 402 may include a topic click-through analyzer 415, topic browse analyzer 416, topic text analyzer 418, and aggregation module 420.

In some embodiments, topic click-through analyzer 415 may be an application 160 that turns user interactions with a particular result of a topical search result comprising a plurality of results that share a particular topic of its associated <topic, result> data pair into topical click-though data. Topic click-through analyzer 415 may collect positional click through data which indicates the position or order number of a result in the topical search result. Topic click-through analyzer 415 may collect click frequency data which is the number of clicks associated with the user interacting with a result of a particular <topic, result> data pair of the topical search result. Topic click-through analyzer 415 may collect click probability data which is the deviation from the expected probability of user interacting with a result of a particular <topic, result> data pair of the topical search result. Topic click-through analyzer 415 may collect is next clicked data which is data to indicate if the user interacts with the immediately subsequent result which is the iteratively subsequent result to the result of a particular <topic, result> data pair of the topical search result. Topic click-through analyzer 415 may collect is previous clicked data is data to indicate if the user interacts with an immediately previous result which is the iteratively preceding the result of a particular <topic, result> data pair of the topical search result. Topic click-through analyzer 415 may collect is click above data is data to indicate if the user interacts with any previous results which iteratively precede the result of a particular <topic, result> data pair of the topical search result. Topic click-through analyzer 415 may collect is click below data which is data to indicate if the user interacts with any subsequent results which iteratively follows the result of a particular <topic, result> data pair of the topical search result.

In some embodiments, topic browse analyzer 416 may be an application 160 that turns user's browsing patterns with a particular result of a topical search result comprising a plurality of results that share a particular topic of its associated <topic, result> data pair into topical browsing data. Topic browse analyzer 416 may collect time on page data which is the time that user spends actively and/or inactively interacting with a result of a particular <topic, result> data pair of the topical search result. Topic browse analyzer 416 may collect cumulative time on page data which is the overall or cumulative time that user spends actively and/or inactively interacting with a result of a particular <topic, result> data pair of the topical search result. Topic browse analyzer 416 may collect time on domain data which is the overall or cumulative time that user spends actively and/or inactively interacting with a domain of a result of a particular <topic, result> data pair of the topical search result. Topic browse analyzer 416 may collect time on short url data which is the overall or cumulative time that user spends actively and/or inactively interacting with a url prefix of a result of a particular <topic, result> data pair of the topical search result. Topic browse analyzer 416 may collect is followed link data which is data that indicates whether the user followed a link to the result of a particular <topic, result> data pair of the topical search result. Topic browse analyzer 416 may collect is exact url match data which is data that indicates whether aggressive normalization is used by the user to interact with the result of a particular <topic, result> data pair of the topical search result. Topic browse analyzer 416 may collect is redirected data which is data that indicates whether an initial url of the result of a particular <topic, result> data pair of the topical search result is the same as a final url. Topic browse analyzer 416 may collect is path from search data which is data that indicates whether the user only followed links subsequent to interacting with the result of a particular <topic, result> data pair of the topical search result. Topic browse analyzer 416 may collect is clicks from search data which is data that indicates the number of hops to reach the result of a particular <topic, result> data pair of the topical search result. Topic browse analyzer 416 may collect is average dwell time data which is data that indicates the average time the user spends on one or more results of a particular <topic, result> data pair of the topical search result. Topic browse analyzer 416 may collect dwell time deviation data which is data that indicates the deviation from the average dwell time the user spends on a result of a particular <topic, result> data pair of the topical search result. Topic browse analyzer 416 may collect cumulative deviation data which is data that indicates the deviation from the average cumulative dwell time the user spends on a result of a particular <topic, result> data pair of the topical search result. Topic browse analyzer 416 may collect domain deviation data which is data that indicates the deviation from the average dwell time the user spends on the domain of a result of a particular <topic, result> data pair of the topical search result.

In some embodiments, topic text analyzer 418 may be an application 160 that turns similarities between a particular result of a topical search result comprising a plurality of results that share a particular topic of its associated <topic, result> data pair and the topic into topic text data. Topic text analyzer 418 may collect title overlap data which is data that indicates the amount of characters shared between the topic and the title of a result of a particular <topic, result> data pair of the topical search result. Topic text analyzer 418 may collect summary overlap data which is data that indicates the amount of characters shared between the topic and a summary of a particular <topic, result> data pair of the topical search result. Topic text analyzer 418 may collect topic url overlap data which is data that indicates the amount of characters shared between the topic and the url of a particular result of a <topic, result> data pair of the topical search result. Topic text analyzer 418 may collect topic domain overlap data which is data that indicates the amount of characters shared between the topic and the url domain of a particular result of a <topic, result> data pair of the topical search result. Topic text analyzer 418 may collect topic length data which is data that indicates the number of tokens in the topic of a <topic, result> data pair of the topical search result. Topic text analyzer 418 may collect topic next overlap data which is data that indicates the number of characters shared between a next topic and a particular topic of a <topic, result> data pair of the topical search result.

In some embodiments, aggregator 420 may be an application 160 that aggregates click-through data from topic click-through analyzer 415, topic browse analyzer 416, and/or topic text analyzer 418 so that a reduced amount of topical click-through data may be stored by the host system relative to the total amount of click through data collected by topic click-through analyzer 415, topic browse analyzer 416, and/or topic text analyzer 418. Various aggregation techniques are known in the art to generally aggregate click-through data and such techniques may be utilized to aggregate the topical click-through data collected by topic click-through analyzer 415, topic browse analyzer 416, and/or topic text analyzer 418.

In some embodiments, the topical click-through data collected by topic click-through analyzer 415, topic browse analyzer 416, and/or topic text analyzer 418 may be stored within a topical click-data store 431 in one or more data sources 430 provided by memory 102 and/or one or more storage devices 125 within computer 180. In some embodiments, data sources 430 may include data warehouses, information corpora, data models, and document repositories. The topical click-data store 431 may enable data storage and retrieval. In some embodiments, the topical click-data store 431 may be a storage mechanism that houses topical click-through data collected by topic click-through analyzer 415, topic browse analyzer 416, and/or topic text analyzer 418 for a threshold period of time until aggregated topical click-data may be generated by aggregator 420. One the topical click-through data collected by topic click-through analyzer 415, topic browse analyzer 416, and/or topic text analyzer 418 has been aggregated it may be deleted from the topical click-data store 431 and replaced with the aggregated topical click-through data from aggregator 420. Data stored in the topical click-data store 431 may be structured in a way to specifically address machine learning requirements. For example, the topical click-data store 431 may store aggregated topical click through data in order to make the processing of the data by machine learning module 206 easier. In some embodiments, the topical click-data store 431 may be a relational database.

The topical click data stored within topical click-data store 431 is generally organized by topic, such that the aggregated click-data contained within a data structure corresponds to the same topic.

Figure 9:
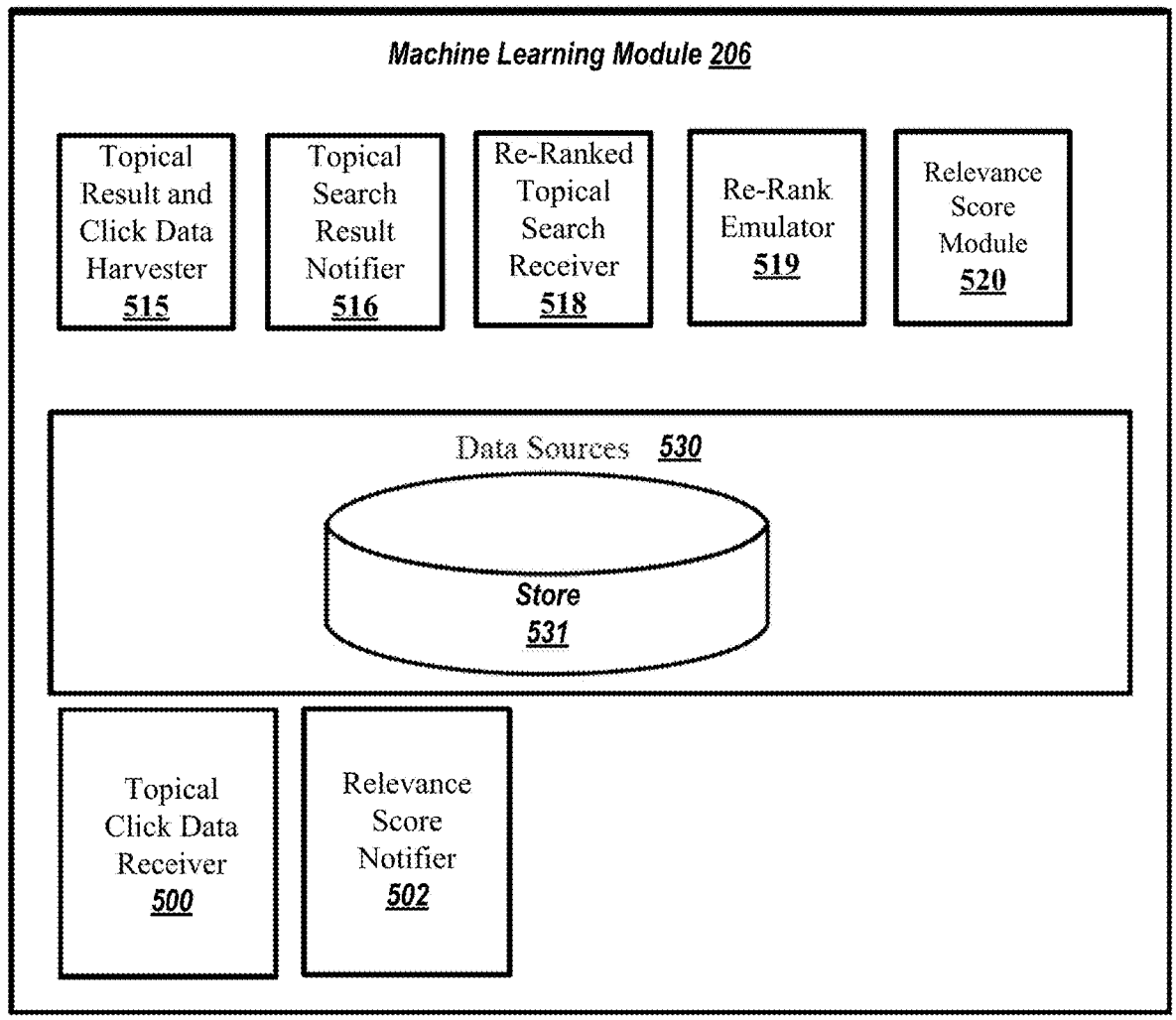
FIG. 9 depicts a block diagram of an exemplary machine learning module, according to one or more embodiments of the present invention.

Referring now to FIG. 9 that which depicts a block diagram of an exemplary machine learning module 206 which includes a topical click data receiver 500 that is configured to receive topical click data or aggregated topical click data from topical click data module 204, a relevance score notifier 502 that sends an assigned relevance score of a result to query re-ranker module 328, a topical result and topical click data harvester 515 which is configured to generate a topical search result, a topical search result notifier 516 which is configured to provide the topical search result to one or more human testers, a re-ranked topical search receiver 518 which is configured to receive a re-ranked topical search results from the one or more human testers, a re-rank emulator 519 which is configured to emulate logic utilized by the one or more human testers to determine relevance of subsequent results, a relevance score module 520 which assigns a relevance score or value to a subsequent result which is indicative to the determined relevance of the subsequent result, one or more data sources 530, and/or a store 531.

Topical click data receiver 500 may be an application 160 that is configured to receive topical click data or aggregated topical click data from topical click data module 204 that is collected by topical click data module 204. Relevance score notifier 502 may be an application 160 that is configured to send the assigned relevance score of a result to query re-ranker module 328.

The topical search result generated by topical result and click data harvester 515 includes a plurality of search results all having at least a shared topic along with the relevant topical click data that is assigned thereto by topical click-data module 204. The topical result and click data harvester 515 may, for example, obtain query, result, topic, and/or click data associated with a shared topic from store 531. The topical result and click data harvester 515 may be an application 160 that assembles the results stored in the store 531 that share an assigned topic into the topical search result.

The topical search result is generally utilized to train re-rank emulator 519 which may be a lean to rank application 160, such as IBM Watson's Retrieve and Rank Service offered by International Business Machines Corporation. Re-rank emulator 519 is trained by topical search result notifier 516 sending the topical search result to one or more human testers whom rank the plurality of search results of the topic search result by relevance. The ranked topical search result is subsequently received from the one or more human testers and assembled into a re-ranked topical search result by re-ranked topical search receiver 518. Re-rank emulator 519 utilizes the re-ranked topical search result and the topical click-data associated therewith as an input to determine the logic utilized by the one or more human testers to determine relevance of results of the topical search result and then emulates that logic to determine relevance of subsequent results. For example, the re-rank emulator 519 may determine that the highest relevant result within the topical search result is a particular result that is associated with aggregated topical click through data indicating that the particular result shares a domain that which users typically spend an above average dwell time. The re-rank emulator 519 may utilize such logical determination to emulate the logic utilized by the one or more humans to rank a subsequent result as highly relevant if the subsequent result is associated with aggregated topical click through data also indicating that the subsequent result shares a domain that which users typically spend an above average dwell time. In an embodiment, re-rank emulator 519 may be located in a different computer 180 relative to a computer 180 that contains module 202, 204, and/or the other components of module 206. For example, re-rank emulator 519 may be located in a first computer 180 and the module 202, 204, and/or the other components of module 206 may be located in a second computer 180. The first computer 180 and the second computer 180 may be connected to each other by a first network 130 and the second computer 180 may be connected to computer 100 by a second network 130.

The re-rank emulator 519 may utilize a relevance score module 520 which assigns a value or score which is indicative to the relevance of the subsequent result as indicated by re-rank emulator 519. When re-rank emulator 519 determines the relevance of multiple results, the relevance score module 520 may assign a relevance score to each of the multiple results. The relevance score assigned by relevance score module 520 may be sent to query re-ranker module 328 that may re-rank results of a search result by the relevance score assigned to each result.

In some embodiments, the data collected by topical result and click data harvester 515, the topical search result sent by topical search result notifier 516, the re-ranked topical search result received by re-ranked topical search receiver 518, the logic utilized by re-rank emulator 519, and the relevance scores assigned by relevance score module 520 may be stored within a store 531 in one or more data sources 530 provided by one or more memory 102 and/or storage devices 125 within computer 180. In some embodiments, data sources 530 may include data warehouses, information corpora, data models, and document repositories. The store 531 may enable data storage and retrieval. In some embodiments, the store 531 may be a storage mechanism that houses query, result, topic, click data structures until there are enough data structures such that re-rank emulator 519 to establish reliable logic that accurately emulates logic of human testers. Data stored in the store 531 may be structured in a way to specifically address machine learning requirements. For example, the store 531 may store houses query, result, topic, click data structures to make the processing of the data by machine learning module 206 easier. In some embodiments, the information corpus 331, topical click-data store 431 and the data store 531 may be the same logical storage structure that stores data that is shared between modules 202, 204, and/or 206.

Figure 10:
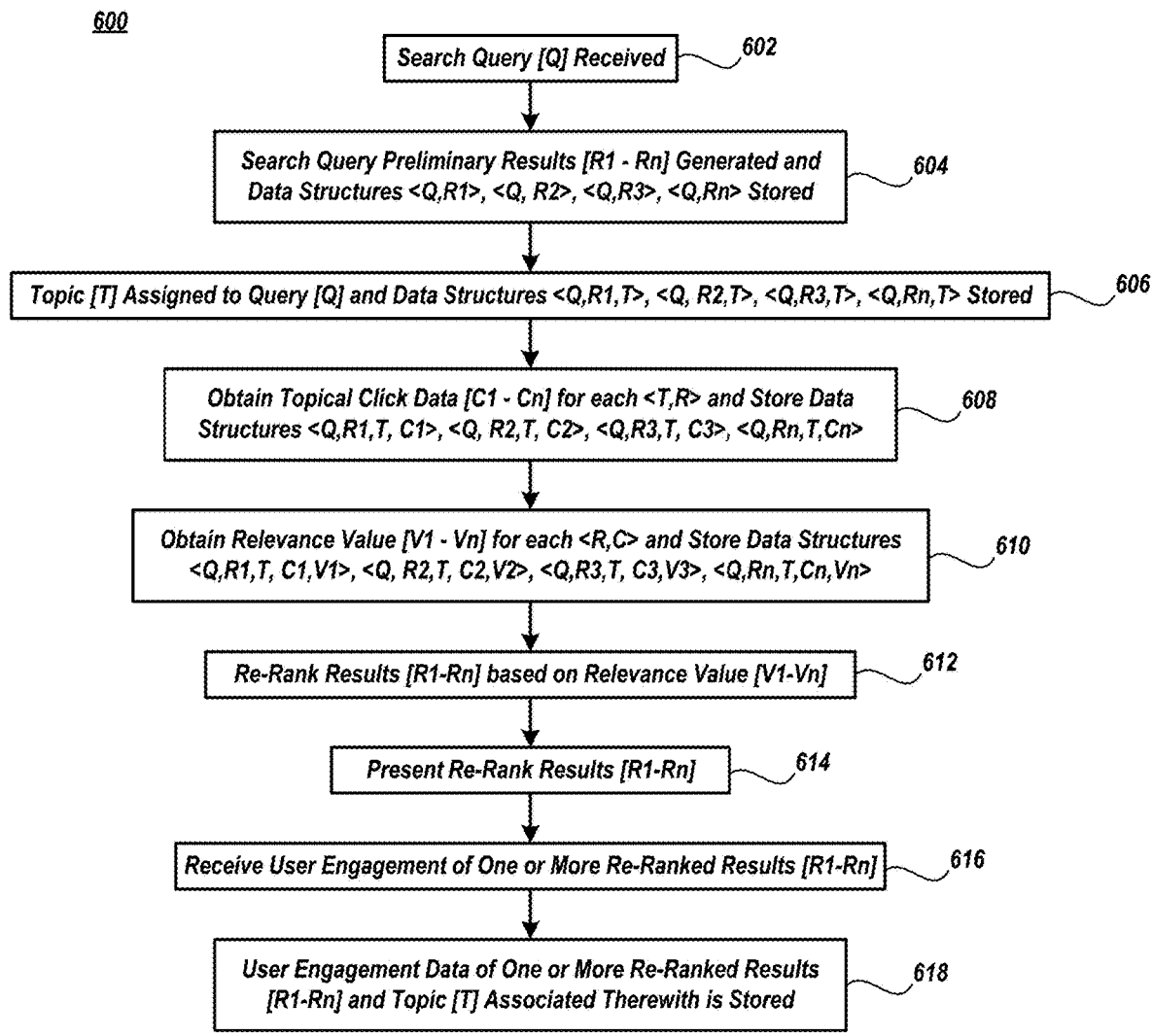
FIG. 10 depicts an exemplary method of returning re-ranked search results by utilizing topical user engagement data in an environment where search result queries are ostensibly dissimilar, according to one or more embodiments of the present invention.

Referring to FIG. 10 which depicts an exemplary method 600 of returning re-ranked search results by utilizing topical user engagement data in an environment where search result queries are ostensibly dissimilar. Method 600 begins at block 602 wherein a computer 180 receives a search query [Q] from query submission module 210 of computer 100 via network 130 (block 602). The environment of method 600 is such that query [Q] is a long form query and is ostensibly different relative to other queries [Q1-Qn] received by computer 180.

Search results [R1-Rn] to the query [Q] are determined by query search module 327 located within the computer 180 and computer 180 forms and stores data structures <Q,R1>, <Q,R2>, <Q,R3>, through <Q,Rn> within memory 102 of computer 180 and/or within one or more storages devices 125 of computer 180 (block 604).

The text string of the query [Q] is analyzed by natural language processor 324 of topic module 202 and a topic [T] is assigned thereto and computer 180 forms and stores data structures <Q,R1,T>, <Q,R2,T>, <Q,R3,T>, through <Q,Rn,T> within memory 102 of computer 180 and/or within one or more storages devices 125 of computer 180 (block 606).

Topic result data pairs <T,R> are sent by topic notifer 326 to topic receiver 400 and topical click through data [C1-Cn] that is classified or otherwise organized by the same topic [T] which is relevant to the particular result or results [R1-Rn] is obtained from topical click-data store 431 and computer 180 forms and stores data structures <Q,R1,T,C1>, <Q,R2,T,C2>, <Q,R3,T,C3>, through <Q,Rn,T,Cn> within memory 102 of computer 180 and/or within one or more storages devices 125 of computer 180 (block 608).

Result [R] and topical click data [C] data pairs <R,C> are sent by topical click data notifier 404 to topical click data receiver 500 and re-rank emulator 519 determines the relevance of the result [R] based upon the topical click data [C] associated therewith, by utilizing relevance logic which is emulated from demonstrated relevance logic of human testers and assigns a relevance value [V] that is indicative of the determined relevance of the result [R] and computer 180 forms and stores data structures <Q,R1,T,C1,V1>, <Q,R2,T,C2,V2>, <Q,R3,T,C3,V3>, through <Q,Rn,T,Cn,Vn> within memory 102 of computer 180 and/or within one or more storages devices 125 of computer 180 (block 610).

Query [Q], result [R], and relevance value [V] data triplets are sent by relevance score notifier 502 to query re-rank module 328 within computer 180 and the results [R1-Rn] are re-ranked by relevance value [V1-Vn] (block 612). For example, the results are re-ranked by re-rank module 328 from high relevance value [V] which is indicative to the result that is most relevant to low relevance value [V] which is indicative to the result [R] that is least relevant as indicated by re-rank emulator 519.

The re-ranked results are sent by query re-rank module 328 to query re-rank result module 211 upon computer 100 via network 130 and the re-ranked results are presented upon computer 100 (block 614). For example, the re-ranked results are displayed within a GUI upon the display, the touch screen, or the like of computer 100.

The computer 100 receives user engagements of one or more of the results [R1-Rn] (block 616) and the computer 100 sends user engagement data (e.g., topic click-through data, topic browse data, topic text date, or the like) to topical click-data store 431 within computer 180 (block 618) for further analysis by topic click through analyzer 415, topic browse analyzer 416, and/or topic text analyzer 418.

Figure 13:
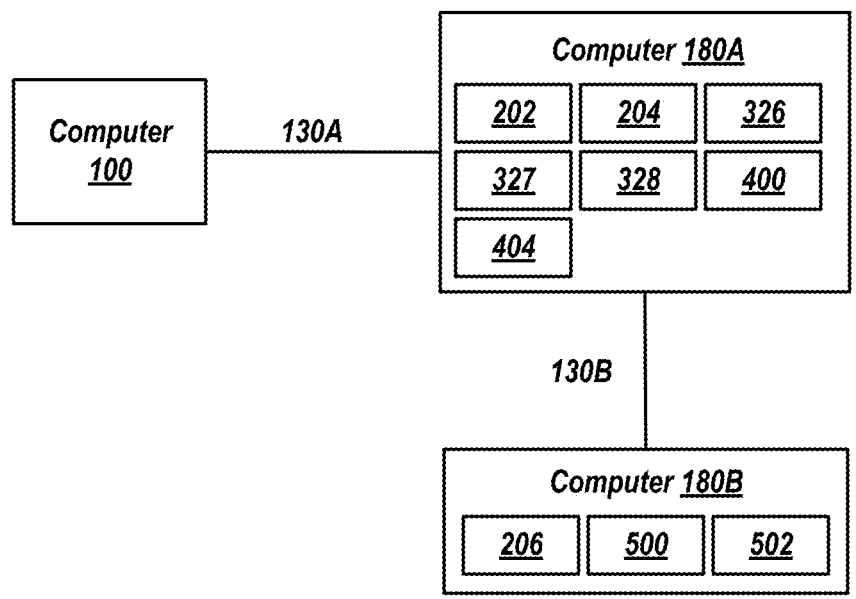
FIG. 13 depicts an exemplary data handling system for returning re-ranked search results by utilizing topical user engagement data where search result queries are ostensibly dissimilar, according to one or more embodiments of the present invention.

Referring to FIG. 13 which depicts an exemplary data handling system for returning re-ranked search results by utilizing topical user engagement data in an environment where search result queries are ostensibly dissimilar. In the data handling system, two distinct host devices (e.g., computer 180A, 180B) are utilized to provide functionality to return re-ranked search results by utilizing topical user engagement data.

One host device (e.g., computer 180A) contains topic module 202, topical click-data module 204, topic notifier 326, search module 327, re-ranker module 328, topic receiver 400, and topical click data notifer 404 and is communicatively connected to a client device (e.g., computer 100) by a first network 130A. Another host device (e.g., computer 180B) contains machine-learning module 206, topical click data receiver 500, and relevance score notifier 502 and is communicatively connected to the first host device by a second network 130B. The first and second networks 130A, 130B are distinct networks.

Such data handling system may be beneficial to return re-ranked search results by utilizing topical user engagement data by provisioning workload amongst multiple host devices such that a particular one or more host devices provide the functionality of a particular topic module 202, topical click-data module 204, and/or machine-learning module 206. In a particular implementation, the entity that operates, manages, or the like the host devices are distinct. For example, the entity that operates computer 100A may be a search engine entity and the entity that operates computer 100B may provide a machine learning service to the search engine entity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
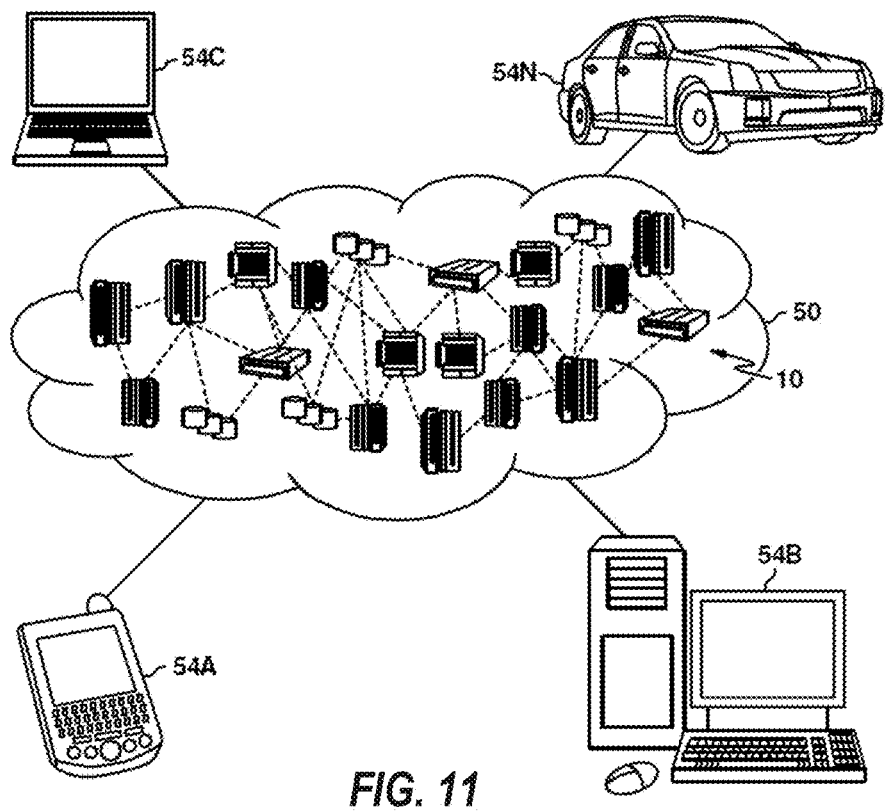
FIG. 11 depicts a cloud computing environment, according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
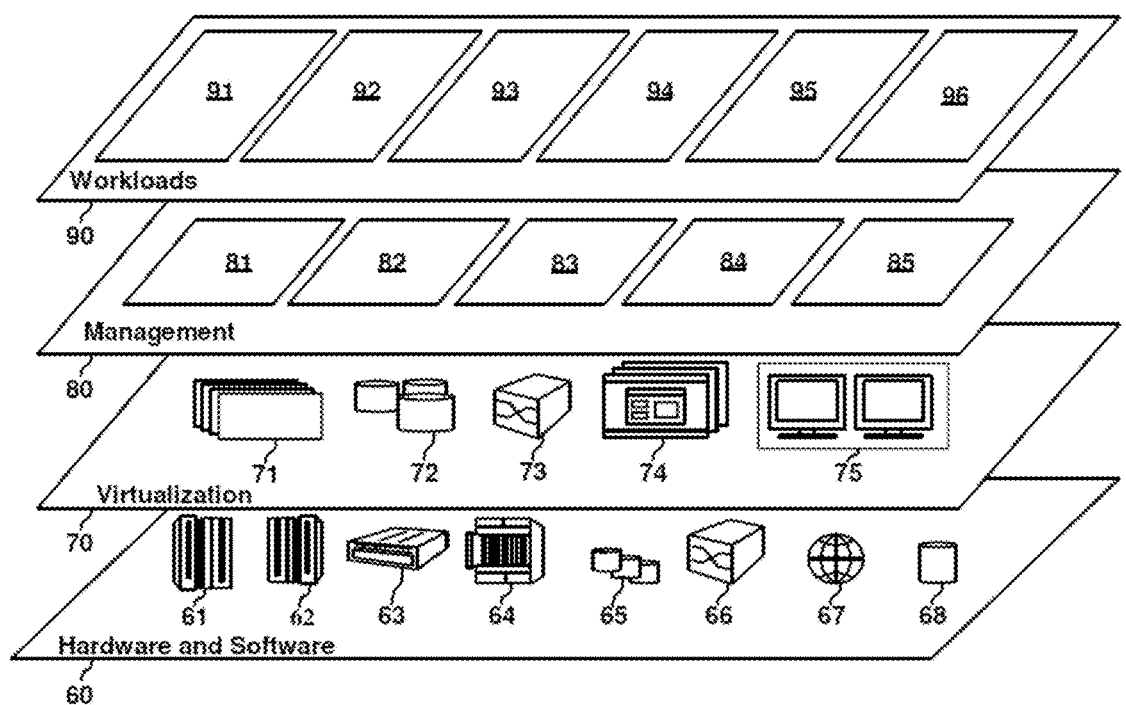
FIG. 12 depicts abstraction model layers, according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing of re-ranked results of a search query 96.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of re-ranking search results by utilizing topical click data in an environment where search result queries are ostensibly dissimilar, the method comprising:

determining, with a host device processor, a preliminary result [R] comprising a plurality of preliminary results of a search query [Q] received by the host device;

subsequent to determining the preliminary result [R] of the search query [Q], saving a <Q,R> data pair to a storage device of the host device, the <Q,R> data pair consisting of the search query [Q] and the preliminary result [R];

determining, with the host device processor, a plurality of topics [T1, Tn] that are representative of the search query [Q], wherein the plurality of topics [T1, Tn] are each single word topics, wherein the single word topic [T1] is weighted as being more representative of the search query [Q] relative to the single word topic [Tn];

subsequent to determining the plurality of topics [T1, Tn] that are representative of the search query [Q], saving a <Q,R,Tn> data triplet to the storage device, the <Q,R,Tn> data triplet consisting of the search query [Q], the preliminary result [R], and the single word topic [Tn];

retrieving, with the host device processor, topical click data of a single word topic that is most representative of the search query [Q], wherein retrieving topical click data of the single word topic that is most representative of the search query [Q] comprises:

attempting to retrieve, with the host device processor, topical click data [C1] of the single word topic [T1] that is weighted as more representative of the search query [Q];

determining, with the host device processor, that no topical click data [C1] of the single word topic [T1] exists; and subsequent to determining that no topical click data [C1] of the single word topic [T1] exists, retrieving, with the host device processor, topical click data [Cn] of the single word topic [Tn], wherein retrieving topical click data [Cn] of the single word topic [Tn] comprises: reading a topical data structure <Q,R,Tn,Cn> from the storage device of the host device, wherein the topical data structure <Q,R,Tn,Cn> consists of the topical click data [Cn], the topic [Tn], the preliminary result [R], and the search query [Q];

determining, with the host device processor, a relevance value [V] of each of the plurality of preliminary results of the preliminary result [R] utilizing the topical click data [Cn];

subsequent to determining the relevance value [V] of the result [R], saving a <Q,R,Tn,Cn,V> data quintuple to the storage device, the <Q,R,Tn,Cn,V> data quintuple consisting of the search query [Q], the preliminary result [R], the single word topic [Tn], the topical click data [Cn], and the relevance value [V] of each of the plurality of preliminary results of the preliminary result [R]; and re-ranking, with the host device processor, the order of the plurality of preliminary results of the preliminary result [R] based upon the relevance value [V] of each of the plurality of preliminary results.

2. The method of claim 1, wherein the storage device of the host device comprises a plurality of topical data structures.

3. The method of claim 1, wherein determining the relevance value [V] of each of the plurality of preliminary results of the preliminary result [R] comprises:

compiling a test search query result comprising a plurality of test results;

sending the test search query result to a tester;

receiving a re-ranked test search query result comprising a re-ranked plurality of test results from the tester;

determining logic utilized by the tester to re-rank the plurality of test results; and emulating the determined logic utilized by the tester to re-rank the order of the plurality of preliminary results of the preliminary result [R].

4. A computer program product for re-ranking search results by utilizing topical click data in an environment where search result queries are ostensibly dissimilar, the computer program product comprising a computer readable storage medium having program instructions embodied therewith, the program instructions readable by the computer to cause the computer to:

determine a preliminary result [R] comprising a plurality of preliminary results of a search query [Q] received by the host device;

subsequent to determining the preliminary result [R] of the search query [Q], save a <Q,R> data pair to a storage device of the host device, the <Q,R> data pair consisting of the search query [Q] and the preliminary result [R];

determine a plurality of topics [T1, Tn] that are representative of the search query [Q], wherein the plurality of topics [T1, Tn] are each single word topics, wherein the single word topic [T1] is weighted as being more representative of the search query [Q] relative to the single word topic [Tn];

subsequent to determining the plurality of topics [T1, Tn] that are representative of the search query [Q], save a <Q,R,Tn> data triplet to the storage device, the <Q,R,Tn> data triplet consisting of the search query [Q], the preliminary result [R], and the single word topic [Tn];

retrieve topical click data of a single word topic that is most representative of the search query [Q], wherein the program instructions that cause the computer to retrieve topical click data of the single word topic that is most representative of the search query [Q] further causes the computer to:

attempt to retrieve topical click data [C1] of the single word topic [T1] that is weighted as more representative of the search query [Q];

determine that no topical click data [C1] of the single word topic [T1] exists; and subsequent to the determination that no topical click data [C1] of the single word topic [T1] exists, retrieve topical click data [Cn] of the single word topic [Tn], wherein the retrieval of topical click data [Cn] of the single word topic [Tn] comprises: reading a topical data structure <Q,R,Tn,Cn> from the storage device of the host device, wherein the topical data structure <Q,R,Tn,Cn> consists of the topical click data [Cn], the topic [Tn], the preliminary result [R], and the search query [Q];

determine a relevance value [V] of each of the plurality of preliminary results of the preliminary result [R] utilizing the topical click data [Cn];

subsequent to determining the relevance value [V] of the result [R], save a <Q,R,Tn,Cn,V> data quintuple to the storage device, the <Q,R,Tn,Cn,V> data quintuple consisting of the search query [Q], the preliminary result [R], the single word topic [Tn], the topical click data [Cn], and the relevance value [V] of each of the plurality of preliminary results of the preliminary result [R]; and re-rank the order of the plurality of preliminary results of the preliminary result [R] based upon the relevance value [V] of each of the plurality of preliminary results.

5. The computer program product of claim 4, wherein the storage device of the host device comprises a plurality of topical data structures.

6. The computer program product of claim 4, wherein the program instructions that cause the computer to determine the relevance value [V] of each of the plurality of preliminary results of the preliminary result [R], further cause the computer to:
- compile a test search query result comprising a plurality of test results;
- send the test search query result to a tester;
- receive a re-ranked test search query result comprising a re-ranked plurality of test results from the tester;
- determine logic utilized by the tester to re-rank the plurality of test results; and
- emulate the determined logic utilized by the tester to re-rank the order of the plurality of preliminary results of the preliminary result [R].

7. A computer comprising:
- a processor; and
- memory communicatively coupled to the processor, wherein the memory is encoded with instructions, wherein the instructions when executed by the processor cause the processor to:
- determine a preliminary result [R] comprising a plurality of preliminary results of a search query [Q] received by the host device;
- subsequent to determining the preliminary result [R] of the search query [Q], save a <Q,R> data pair to a storage device of the host device, the <Q,R> data pair consisting of the search query [Q] and the preliminary result [R];
- determine a plurality of topics [T1, Tn] that are representative of the search query [Q], wherein the plurality of topics [T1, Tn] are each single word topics, wherein the single word topic [T1] is weighted as being more representative of the search query [Q] relative to the single word topic [Tn];
- subsequent to determining the plurality of topics [T1, Tn] that are representative of the search query [Q], save a <Q,R,Tn> data triplet to the storage device, the <Q,R,Tn> data triplet consisting of the search query [Q], the preliminary result [R], and the single word topic [Tn];
- retrieve topical click data of a single word topic that is most representative of the search query [Q], wherein the program instructions that cause the processor to retrieve topical click data of the single word topic that is most representative of the search query [Q] further causes the processor to:
  - attempt to retrieve topical click data [C1] of the single word topic [T1] that is weighted as more representative of the search query [Q];
  - determine that no topical click data [C1] of the single word topic [T1] exists; and
  - subsequent to the determination that no topical click data [C1] of the single word topic [T1] exists, retrieve topical click data [Cn] of the single word topic [Tn], wherein the retrieval of topical click data [Cn] of the single word topic [Tn] comprises: reading a topical data structure <Q,R,Tn,Cn> from [a] the storage device of the host device, wherein the topical data structure <Q,R,Tn,Cn> consists of the topical click data [Cn], the topic [Tn], the preliminary result [R], and the search query [Q];
- determine a relevance value [V] of each of the plurality of preliminary results of the preliminary result [R] utilizing the topical click data [Cn];
- subsequent to determining the relevance value [V] of the result [R], save a <Q,R,T,C,V> data quintuple to the storage device, the <Q,R,Tn,Cn,V> data quintuple consisting of the search query [Q], the preliminary result [R], the single word topic [Tn], the topical click data [Cn], and the relevance value [V] of each of the plurality of preliminary results of the preliminary result [R]; and
- re-rank the order of the plurality of preliminary results of the preliminary result [R] based upon the relevance value [V] of each of the plurality of preliminary results.

8. The computer of claim 7, wherein the storage device of the host device comprises a plurality of topical data structures.

9. The computer of claim 7, wherein the program instructions that cause the processor to determine the relevance value [V] of each of the plurality of preliminary results of the preliminary result [R] further cause the processor to:
- compile a test search query result comprising a plurality of test results;
- send the test search query result to a tester;
- receive a re-ranked test search query result comprising a re-ranked plurality of test results from the tester;
- determine logic utilized by the tester to re-rank the plurality of test results; and
- emulate the determined logic utilized by the tester to re-rank the order of the plurality of preliminary results of the preliminary result [R].

* * * * *